(12) United States Patent
Jones

(10) Patent No.: US 8,005,457 B2
(45) Date of Patent: Aug. 23, 2011

(54) METHOD AND SYSTEM FOR VERIFYING NETWORK RESOURCE USAGE RECORDS

(76) Inventor: Adrian Jones, Monaco (MC)

( * ) Notice: Subject to any disclaimer, the term of this patent is extended or adjusted under 35 U.S.C. 154(b) by 488 days.

(21) Appl. No.: 11/219,030

(22) Filed: Sep. 2, 2005

(65) Prior Publication Data

US 2007/0054654 A1    Mar. 8, 2007

(51) Int. Cl.
    *H04M 11/00*    (2006.01)
(52) U.S. Cl. ......... 455/406; 455/407; 455/408; 455/410
(58) Field of Classification Search .................. 455/406, 455/407, 408, 405, 410, 411; 379/115.01, 379/114.03, 145
    See application file for complete search history.

(56) References Cited

U.S. PATENT DOCUMENTS

| | | | | |
|---|---|---|---|---|
| 6,327,350 B1 * | 12/2001 | Spangler et al. | ......... | 379/115.01 |
| 6,622,248 B1 * | 9/2003 | Hirai | .............................. | 713/193 |
| 7,231,024 B2 * | 6/2007 | Moisey et al. | ................. | 379/126 |
| 2002/0118813 A1 * | 8/2002 | Brehm et al. | ................. | 379/229 |
| 2002/0188562 A1 * | 12/2002 | Igarashi et al. | .................. | 705/40 |
| 2005/0177515 A1 | 8/2005 | Kalavade et al. | | |
| 2005/0182680 A1 * | 8/2005 | Jones et al. | ...................... | 705/15 |
| 2007/0201641 A1 * | 8/2007 | Bar et al. | ................. | 379/114.03 |

FOREIGN PATENT DOCUMENTS

| | | |
|---|---|---|
| EP | 1014646 | 6/2000 |
| JP | 10-190737 | 7/1998 |
| JP | 2002-518883 | 6/2002 |
| WO | WO 99/65184 | 12/1999 |

* cited by examiner

*Primary Examiner* — Joseph Feild
*Assistant Examiner* — Huy D Nguyen
(74) *Attorney, Agent, or Firm* — Blakely, Sokoloff, Taylor & Zafman

(57) ABSTRACT

A system and method for enabling verification of billing data received from an operator of a network resource access gateway by a billing service provider. An access gateway device is coupled to a network user device and to a billing service provider's system. The network user device generates billing data. The access gateway device is configured to compare received billing data with corresponding billing data generated by the access gateway device and if the received billing data correlates to the billing data generated by the access gateway device, the access gateway device stores portions of the received billing data.

20 Claims, 3 Drawing Sheets

Overview Diagram

METHOD AND SYSTEM FOR VERIFYING NETWORK RESOURCE USAGE RECORDS

DEFINITIONS

Network Resource: any service or facility that can be made available and accepted for use or delivery by digital transmission over a network, even if actual fulfilment is carried out by some alternate means. May include Internet or other network access, data storage and data processing, among others.

Network Resource Access Gateway ("Access Gateway"): the device (or collection of devices) that controls access to Network Resources of any kind (e.g. access point, wireless gateway, router, wireless router, switch, application gateway, etc.)

Network user device ("Device"): any network-capable device (e.g. laptop computer, PDA, smartphone, video games machine, music/video player, measurement instrument, digital camera, etc.) that can connect to a network via a Network Resource Access Gateway and make use of any Network Resource.

Network Resource User ("User"): Any person or entity that uses or controls a Network user device to gain access to Network Resources via a Network Resource Access Gateway.

Network Resource Access Gateway Operator ("Access Gateway Operator"): The operator of one or more Network Resource Access Gateways.

Network Resource Usage Statistics ("Usage Statistics"): any data that could be used for accounting and management purposes that details precisely the Network Resources used.

Billing Data: any data, however encoded, that could be used as the basis for invoicing or otherwise charging a User of Network Resources and may consist of Network Resource Usage Statistics or might be monetary (or other) data, calculated at least in part on the basis of Network Resource Usage Statistics.

Billing Service Provider: the entity that is responsible for invoicing or otherwise charging a Network Resource User for Network Resources used and for corresponding settlement of payments due to Network Resource Access Gateway Operators using billing data.

Network Resource AAA System ("AAA System"): the system responsible for authenticating Network Resource Users, authorizing their access to particular Network Resources and accounting for those Network Resources utilized; usually operated by the Billing Service Provider.

BACKGROUND OF THE INVENTION

There are an increasing number of network environments where Network Resource access infrastructure is operated independently of the Billing Service Provider that maintains the accounting/billing relationship with the Network Resource User. This happens especially in the unregulated wireless network access spectrum (e.g. 802.11a/b/g, etc.) where a growing number of Users of wireless-capable Devices are accessing the Internet via independent 'wireless hotspot' operators who, in turn, have authorization and settlement arrangements with the Users' Billing Service Providers. Where the User has no direct commercial relationship with the wireless hotspot operator, these arrangements are often known as 'roaming agreements'. Whenever a User accesses the Internet via a wireless hotspot, the hotspot's operator (or their equipment) is usually responsible for sending Network Resource Usage Statistics to the Billing Service Provider, detailing information such as identity of the User, date/time of initial connection, type of Network Resource used, length of time connected, amount of data transferred, etc., so that the Billing Service Provider may charge the User correctly and also remunerate the hotspot operator for use of their Network Resource access infrastructure. Although most of this accounting is carried out automatically, using standard Authentication, Authorization and Accounting (AAA) protocols such as RADIUS (RFC 2865/2866) and DIAMETER (RFC 3588) and accounting protocols such as CRANE (RFC 3423), CIBER, TAP and IPDR (ipdr.org), which include provision for encrypted data transfer, it remains possible for the hotspot operator to manipulate their system (through software and/or hardware modifications) so that Network Resource Usage Statistics are exaggerated in their favour (e.g. by inflating the reported amount of data transferred, overstating the length of connection or misreporting the type of resource used, etc.). This is a serious issue because it is almost impossible for the Billing Service Provider to detect fraud of this type using present standards and technologies. The Billing Service Provider is almost entirely limited to carrying out audit-style spot-checks to try to detect any inaccurate reporting. Even assuming such spot-checks can be carried out without detection as such, they are costly to undertake and prone to miss many cases of inaccurate reporting, particularly where it is not constant. The Network Resource User is also extremely unlikely to notice any discrepancy unless the fraud is egregious and the User is able to check against any connection logs that may have been created by their Device. The potential for fraud becomes far more serious as an ever increasing number of Network user device Users access chargeable Network Resources via Access Gateway Operators who are independent of their Billing Service Providers.

PRIOR ART

The prior art has done little to address this problem, for good reason: In the traditional telecommunications model (whether conventional fixed line or mobile telephony, data networking or ISP), the Billing Service Provider is also usually the Access Gateway Operator. The Billing Service Provider therefore implicitly trusts the Network Resource Usage Statistics transmitted to its AAA System by the Access Gateway. In some business models, such as is the case with some ISPs and "virtual" telecommunications operators, the Billing Service Provider enters into agreements with other telecommunications companies who operate the Access Gateways (e.g. distributed banks of dial-in modems, cellular telephony base stations or remote wireless access gateways). There is usually little concern in these situations that the Access Gateways will be manipulated to generate fraudulent Network Resource Usage Statistics, since the operators are large companies with (generally) good reputations to protect. However, the potential for fraud has been widely recognised, including in some of the Internet's standards documents in this area, and some measures have been taken to help protect against it. For example, in May 1999, Zorn, G. and Calhoun, P. published a paper, "Limiting Fraud in Roaming", (available as: draft-ietf-roamops-fraud-limit-00.txt) as an IETF work-in-progress, highlighting different methods of potential fraud that remain possible in today's network infrastructure (particularly in relation to the widely-used RADIUS protocol) and some possible solutions. The IETF's latest standard for Authentication, Authorization and Accounting—that for Diameter (RFC 3588), published in 2003—attempts to address some elements of potential accounting fraud. Under section 1 (introduction) of the standard, there is a sub-section on 'Auditability'. It has the following paragraph about RADIUS:

RADIUS does not define data-object security mechanisms, and as a result, untrusted proxies may modify attributes or even packet headers without being detected. Combined with lack of support for capabilities negotiation, this makes it very difficult to determine what occurred in the event of a dispute. While implementation of data object security is not mandatory within Diameter, these capabilities are supported, and are described in [AAACMS].

In both Diameter and proprietary developments, the recent prior art has focused on maintaining the security and integrity of Network Resource Usage Statistics during transmission between the Access Gateway and the Billing Service Provider. For example, while Diameter supports optional implementation of data object security, it only does so to prevent untrusted intermediate proxy servers from modifying the accounting data. It does not address the other fundamental issue of how you ensure the accuracy of the original accounting data in the first place—and how you can audit it. If the Access Gateway generates Net,work Resource Usage Statistics based on a validly authenticated and authorized User, use of the prior art only ensures that these records can be transmitted back to the Billing Service Provider without meaningful risk of undetected modification.

Under the prior art, FIG. 1 illustrates (in overall terms) how an Access Gateway typically accounts for a Network user device's Network Resource usage:

1) The Access Gateway receives a request from a Network user device to provide access to some kind of Network Resource (e.g. Internet access). Ordinarily, the Network user device sends some form of credentials as part of this request (e.g. user name, hashed password, service required, etc.)
2) The Access Gateway then makes a request of the AAA System to determine whether service may be provided to the User and Device.
3) The Access Gateway receives a response from the AAA System. Provided the response is positive, the process continues.
4) The Access Gateway makes the authorized Network Resource available to the Network user device. It also (ordinarily) notifies the AAA System that it is starting accounting for the Network user device's Network Resource consumption.
5) The Access Gateway deals with network traffic to/from the Network user device in accordance with the Network Resource authorized for use, while keeping track of the Network user device's Network Resource consumption by recording Network Resource Usage Statistics.
6) The Access Gateway receives a request to terminate the current communications session from the Network user device. Termination may also occur for a number of alternative reasons, including: i) the Access Gateway's timers record a sufficient period of inactivity to terminate the session as a timeout; ii) the Access Gateway detects termination of the connection by the Network user device without a formal request; iii) notification is received from the AAA System that the session must be terminated (e.g. due to the User's credit limit being reached) and iv) the Access Gateway's administrator instructs termination of the session.
7) The Access Gateway generates an Accounting Record (Network Resource Usage Statistics) containing details of the Network Resources consumed by the Network user device and sends it to the AAA System.

Traffic between the Access Gateway and AAA System may pass between any number of proxy servers. The prior art can provide what is currently considered adequate protection to prevent tampering with data transmitted between these components by using end-to-end encryption and transmissions protocols that are resistant to man-in-the middle attacks and replays.

In the evolving world of unregulated WiFi roaming, where Access Gateways can be anywhere and operated by anyone, the potential for fraud at the point of generating the Network Resource Usage Statistics has increased substantially. Many WiFi 'hotspot' operators are small businesses or individuals without necessarily the same reputations or credentials as the larger telecommunications companies. Currently, some companies that operate as Billing Service Providers in this field (e.g. iPass, Boingo, etc.), use audit-style spot-checks to test the validity of Network Resource Usage Statistics from different Access Gateway Operators that they have direct or indirect commercial arrangements with. The spot-check test User will undertake one or more sessions accessing Network Resources from a Network user device via an Access Gateway and keep a detailed log of Network Resource usage by the Network user device. The resulting data is later compared with the data logged with the Billing Service Provider to check for accuracy.

SUMMARY OF THE PRESENT INVENTION

The present invention provides a system and method to ensure that the Network Resource Access Gateway (e.g. wireless router or access server) generates Billing Data that can be independently verified (e.g. by the Billing Service Provider) as accurate to a particular level of Network Resource usage granularity. The invention also provides a system and method for the Network Resource Access Gateway to determine whether to terminate connections of any Devices where the Network Resource User might attempt to repudiate their Network Resource usage (either fraudulently or mistakenly).

SUMMARY OF THE PROBLEM

1. Referring to FIG. 2, each of the parties depicted operates with independent commercial motives.
2. The User ("U") is concerned that the Access Gateway Operator ("A"), who he may not know or trust, will try to overcharge him by inflating the record of his Network Resource usage sent to the Billing Service Provider ("B"). However, the User has chosen to trust B and has entered into a commercial relationship with him.
3. The Access Gateway Operator is concerned that the User, who he may not know or trust, will somehow try to dispute his accurate record of Network Resource usage sent to the Billing Service Provider. However, the Access Gateway Operator has chosen to trust B and has entered into a commercial relationship with him.
4. The Billing Service Provider does not trust either the Access Gateway Operator or the User independently but his responsibility is to settle charges between them. If both A and U agree on the type and quantity of Network Resource used (and B is confident that their agreement cannot have been tampered with), then B trusts their mutual agreement.

BRIEF SUMMARY

U does not trust A
A does not trust U

U trusts B

A trusts B

B does not trust U or A independently except if they demonstrate mutual agreement

COMMUNICATIONS

U can communicate directly to A

A can communicate directly to U

U can only communicate to B via A

B can only communicate to U via A

Any situation where information has to be passed via an untrusted intermediary causes potential issues of integrity. Even when using a strong cryptosystem, communications between U and B and B and U are susceptible to various forms of substitutions, replays or man-in-the-middle attacks. A is a man-in-the-middle with a potential commercial incentive to commit such an attack.

DETAILED DESCRIPTION OF THE INVENTION

The present invention is based on the premise that if two parties to a transaction who do not trust each other agree on a detailed record of that transaction—and that record cannot later be modified without detection—then the agreed details of the transaction cannot later be repudiated by either party. More specifically, in the case of a Network Resource usage transaction, where the details of the transaction are changing over time (as Network Resources are consumed over time) and either party can unilaterally walk away from the transaction in progress (by dropping the connection without prior notification to or agreement of the other party), the only record of the transaction that is guaranteed not to be repudiated by either party, is their latest agreement on the then-outstanding state of the transaction.

The present invention therefore involves improvements to Access Gateway 11 enabling it to keep track of the latest state of agreement between it and the Network user device 13 for Network Resources consumed during a session utilizing Network Resources (such as utilization of a network 15 or storage attached to a network 15). This dynamic state of agreement is updated periodically during the network session and is non-modifiable by the Access Gateway without later being detectable. An AAA system 17 utilized by a Billing Service Provider authenticates Users and their access to Network Resources using network 15.

Figure 1:
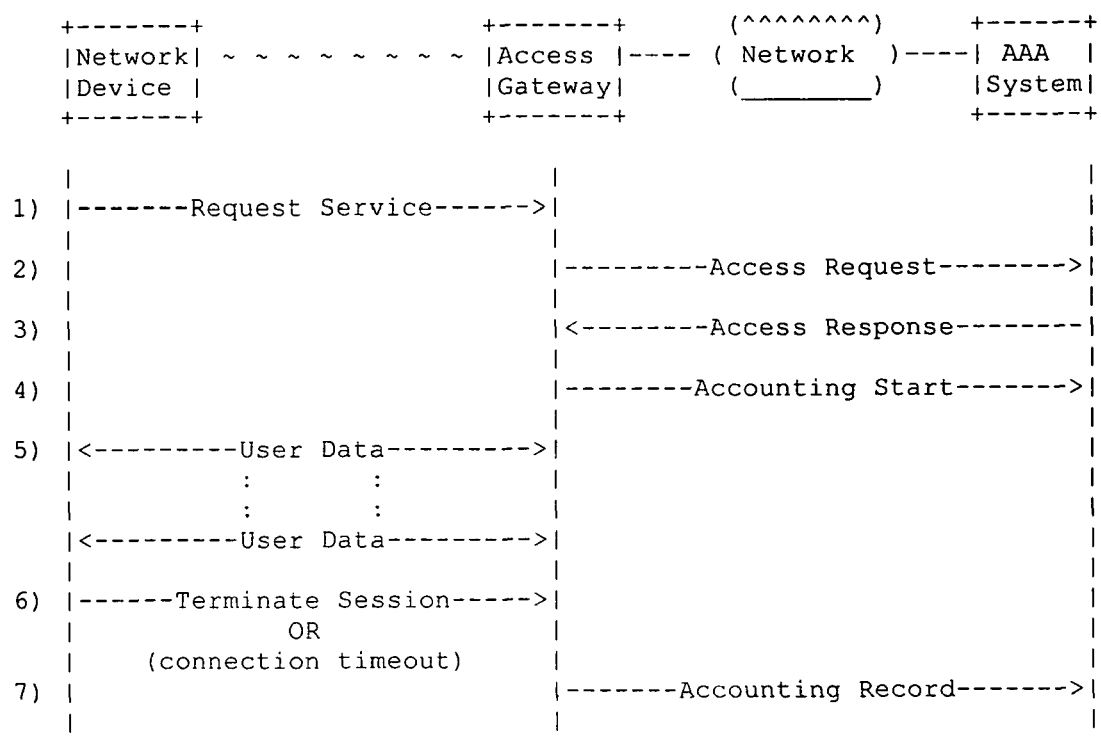
FIG. 1 illustrates how an Access Gateway accounts for a Network user device's Network Resource usage according to the prior art.
Figure 2:
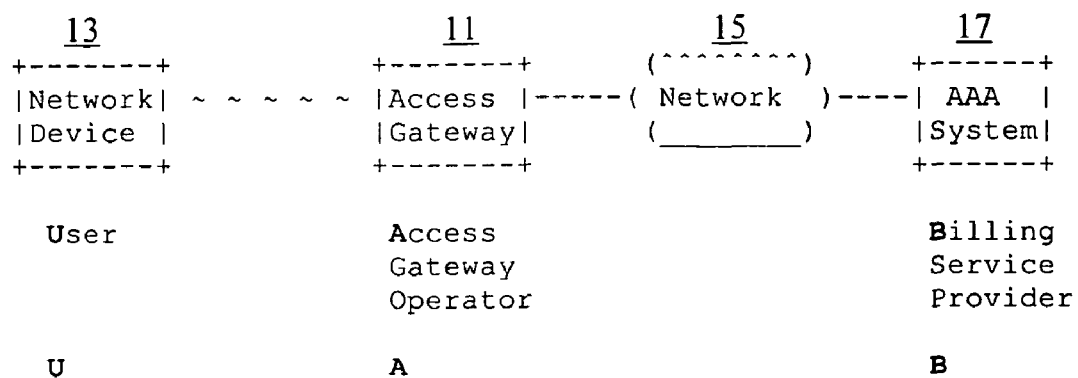
FIG. 2 is a block overview diagram showing the relationship of the Access Gateway to system which provides network access and accounting for Network Resource usage.
Figure 3:
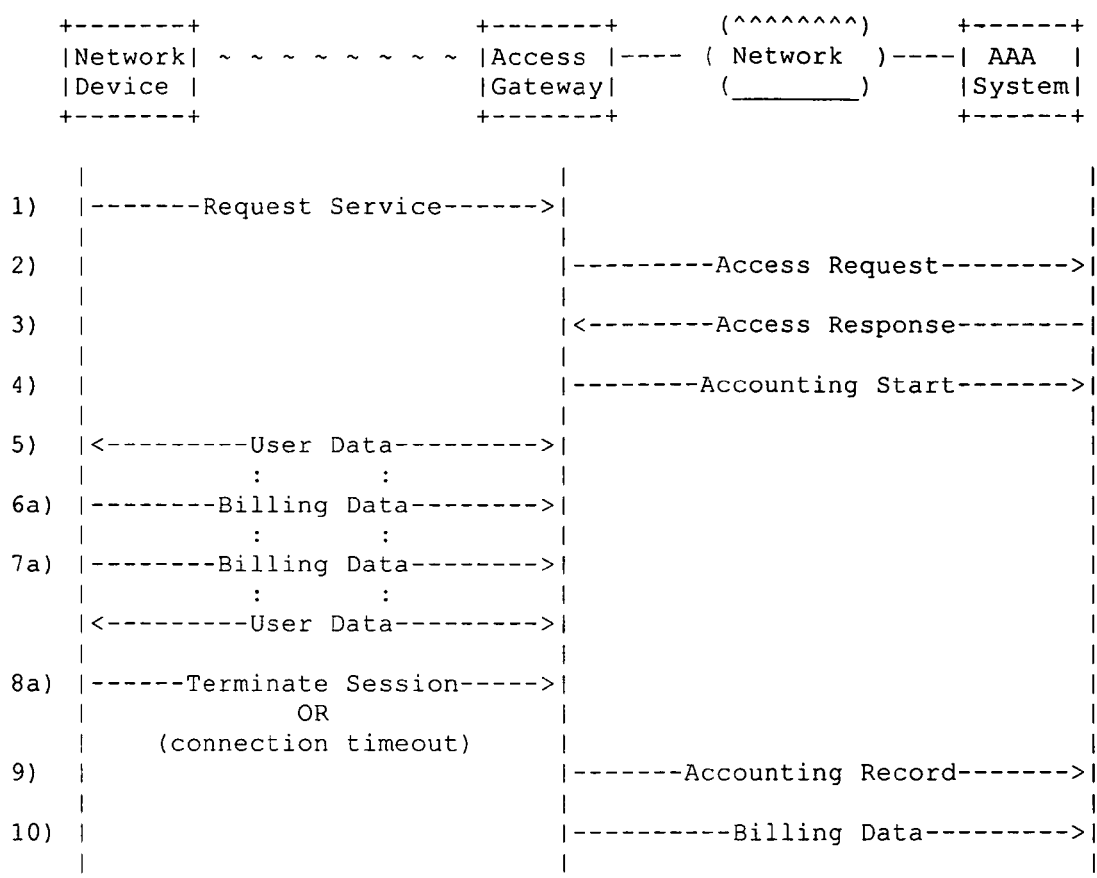
FIG. 3 illustrates how an Access Gateway accounts for a Network user device's Network Resource usage according to the present invention.

FIG. 3 illustrates the principal changes to the prior art under the present invention:

Steps 1-5 are exactly the same as for the prior art shown in FIG. 1. Step 8a is the same as Step 6 for the prior art, except for where there is an explicit termination of session by the Network user device, in which case, it is as detailed below. Step 9 is the same as Step 7 of the prior art. Also shown in FIG. 3 are the necessary new steps 6a, 7a and 10:

6a) From time-to-time during the session, typically, approximately every 10 seconds (though entirely dependent on the requirements of the specific implementation to reflect factors such as the cost and volume of Network Resources utilized), the Access, Gateway receives from the Network user device Billing Data that is a function of the Network user device's record of Network Resource Usage Statistics for one or more parameters of its Network Resource consumption through the Access Gateway, referenced off some commonly known base point (preferably, start of current session). The Access Gateway has some means, such as by decoding the received billing data using the Network user device's public key, of reading one or more parameters in the received billing data, so that it can determine whether one or more of the parameters correlate(s) with the Access Gateway's own record of those parameters. In determining the correlation (e.g. comparison of time connected or volume of data transferred), the Access Gateway may take into account the latency involved in generating and transmitting the billing data. More specifically, it would need to determine whether the received parameter(s) is/are within the specific range of values that would be expected by the Access Gateway when allowing for the time delays (typically from a few milliseconds up to 1-2 seconds) that would have occurred due to data processing by the network user device (including encoding) and network latency. In some cases (e.g. if connection time was the Network Resource being reported every 10 seconds), the expected range of values would only be a single value (i.e. in the previously mentioned case, the Access Gateway's current session time counter, rounded down to the nearest 10 seconds). The received billing data, while containing one or more parameters that are readable by the Access Gateway, must contain at least one portion encoded in such a fashion that those parameter(s) may not be modified or replaced (including by all or part of a previous session's billing data) without later detection being possible by a qualified third-party (e.g. one that holds, among other things, a corresponding secret to the one used by the Network user device to encode the data). While the prior art for suitable encoding methods is well understood, several possible encoding methods are detailed below. In the prior art, when spot-check audits are carried out using remote devices keeping connection logs, a similar comparison is undertaken (without requiring any special form of encoding), though not until after the network resource usage session has terminated, as that is the first time when the access gateway's network resource usage statistics become available in the prior art (in the form of an accounting record). This invention depends on the comparison occurring actively during network resource usage, since the amount of network resource used might otherwise later be repudiated. If the access gateway disagrees with what it receives (from a Network User Device) during an active session, then it has the ability to terminate the active network resource usage immediately.

1) If the Access Gateway determines that the parameters (or any derivatives thereof) included in newly received billing data do not correlate with its own record or calculation of those parameters (e.g. it appears that the Network user device is understating its consumption of Network Resources), then the Access Gateway may terminate the session. If the Access Gateway concurs with the received parameter(s), then it stores the received billing data (or at least one or more of its encoded parameters) and continues to provide service to the Network user device.

2) If the Access Gateway does not receive billing data relating to a parameter that it is expecting within an anticipated timeframe, then the Access Gateway may terminate the session. (For example, the Access Gateway may be required to obtain up-to-date billing data after every 10 seconds of connection time. If it has not received such data after 12 seconds, which allows a grace period for the Network user device to generate the data and for subsequent latency in network transmission, the Access Gateway may terminate the session).

3) It should be noted that the received Billing Data may consist of or contain, in a suitably encoded format, one or more of the following:

Some or all of the network resource usage statistics; or

A derivation from some or all of the network resource usage statistics; or

A (digitally signed) "payment" or "authorization" acknowledgement that relates to the consumption of network resource (i.e. agreed to purchase X units). For example, in one embodiment, the access gateway might have sent a notice to the Network User Device that it has used 30 minutes of connection time and therefore needs to acknowledge that payment for $1 is due. In this case, the Network User Device would use its own record of network resource usage statistics to confirm that 30 minutes had been used and therefore send an authorization for $1 to the access gateway, though it need not reference the network resource usage statistics. The authorization would be a function of the network resource usage but would not necessarily be directly derived from it.

7a) Step 7a is a repetition of step 6a. The Access Gateway continues to receive Billing Data from the Network user device during the session and processes it as in step 6a. The frequency with which the Billing Data is received by the Access Gateway depends on implementation and configuration. In one embodiment, at authorization of the session, the Access Gateway would receive notification from the AAA System of which parameters were to be tracked as Network Resource Usage Statistics and with what frequency. It would also pass these parameters on to the Network user device. In other embodiments, the parameters and frequency may be preset or pre-configured into the Access Gateway and Network user device.

If the Access Gateway receives a formal session termination notification from the Network user device, it may also receive one or more corresponding sets of Billing Data earlier than otherwise anticipated. It processes these in the same manner as step 6a.

The Access Gateway forwards to the AAA System (directly or indirectly) the most recently received and verified (i.e. correlated) billing data—or at least predetermined portions thereof—in the encoded form as received from the Network user device.

More specifically, the forwarded data must include at least sufficient portions of encoded billing data (forwarded in a format compatible with the receiving AAA System) such that the AAA System can verify that this data could only have originated from the User's network user device (and that any specific parameters encoded therein have not been modified) and such that the AAA System would have sufficient data to compare any billing data that needs to be verified with corresponding accounting data or other billing data generated by the Access Gateway and also forwarded to the AAA System. If more than one Network Resource is being monitored, then multiple sets of billing data (or portions thereof) may be forwarded by the Access Gateway to the AAA System.

Encoding Methods

To ensure that the Billing Data received by the Access Gateway from the Network user device may not be tampered with by the Access Gateway without later being detectable by the AAA System, a special method of encoding at least one portion of the billing data must be employed. The Billing Data must consist of or contain the result(s) of one or more transformation functions that are dependent on both the parameters that need to be non-modifiable and a secret key that is unknown to (and computationally infeasible to determine) the Access Gateway. The transformation function can be any function where it is computationally infeasible to determine the result of the transformation function for one or more chosen parameter values without knowledge of the secret key. The encoded portion(s) of Billing Data must also incorporate provision to prevent previously valid (encoded) Billing Data from being reused (i.e. in what would commonly be referred to in cryptography as a replay attack). Such provision could be provided, for example, by incorporating one or more of a unique session identifier and/or timestamp into the portion(s) of Billing Data prior to encoding. Safe methods of generating and managing such anti-replay 'keys' and ensuring that later detection of reused data is possible are well understood and beyond the scope of this invention.

The following examples illustrate alternate encoding methods and their relative advantages and disadvantages for different implementation scenarios:

Asymmetric (Public Key) Cryptography Data Encoding

The data is encoded by the Network user device using the User's private (secret) key.

It can be decoded by the Access Gateway using the User's public key, which would need to be provided to the Access Gateway as part of the implementation protocol.

Advantages: Compactness of data that is received/transmitted over the network; no risk of secret key leakage from the Billing Service Provider.

Disadvantages: Requirement to deliver the User's public key to the Access Gateway at initiation of the session; relatively high processing requirement to support currently-known forms of asymmetric cryptography.

Plaintext with Digitally Signed Hash

The data is encoded by the Network user device appending to the plaintext (unencrypted) data a digitally signed hash created using the plaintext data and the User's private (secret) key.

The Access Gateway can read the plaintext data without any additional requirements, though cannot modify it without causing the digitally signed hash to become invalidated. The Access Gateway can check the validity of the digitally signed hash by generating its own hash of the plaintext and comparing it with the digitally signed hash decoded by using the User's public key (which would need to be provided to the Access Gateway as part of the implementation protocol).

Advantages: Potentially higher performance than encryption of all the plaintext data.

Disadvantages: Increased length of the encoded data, creating slightly higher level of network traffic.

Symmetric Cryptography

While symmetric cryptography using a secret key unknown to the Access Gateway could be used in this invention as an encoding method for portions of the received billing data (e.g. to:encrypt a hash of plaintext along with plaintext data), it is not a preferred method of encoding. The main reason for this is that it would make it impossible for the Access Gateway to determine with certainty that the received billing data correlated fully with its own billing data, even if the portions that it could read did so (e.g. the plaintext might correlate but the encrypted hash might not). Providing all the Billing Data (both received and that generated by the Access Gateway) were forwarded to the AAA System, patterns of fraudulent activity might be picked up and it would likely be possible to determine over multiple sessions across different Access Gateways whether it were a rogue Access Gateway modifying received Billing Data or a rogue Network User Device submitting inconsistent Billing Data, but this would not be possible for any single Network Resource usage session, so the value of the invention would be diminished.

Of course, prior to a User being able to initiate a session using Network Resources, the Access Gateway would have contacted the AAA System to authenticate a connection from the Network User Device's User. If the AAA System determined that the Access Gateway was untrusted (e.g. operated by a third-party), a protocol for establishing an authenticated connection would need to be implemented. However, the details of such a protocol are not needed for a proper understanding of the invention as defined by the following claims.

I claim:

1. A system for enabling verification of billing data received from an operator of a network resource access gateway by a billing service provider comprising:
    an access gateway device for coupling to a network user device and to a billing service provider's system, said network user device generating billing data based on actual network resource usage of said network user device, wherein said actual network resource usage of said network user device corresponds to at least one of an amount of time of connection of the network user device to the access gateway device, and a volume of data caused to be transferred by operation of said network user device, said access gateway device configured to compare received billing data from said network user device with corresponding billing data generated by said access gateway device during network resource usage and if said received billing data correlates to said billing data generated by said access gateway device, said access gateway device stores predetermined portions of said received billing data.

2. The system defined by claim 1 further comprising a decoder which operates to decode said received billing data prior to comparing said received billing data with said corresponding billing data.

3. The system defined by claim 2 where said decoder performs one of asymmetric cryptography data decoding and digitally signed hash decoding from plaintext with digitally signed hash.

4. The system defined by claim 1 wherein said access gateway transmits said predetermined portions of said received billing data to said billing service provider.

5. The system defined by claim 4 where said received billing data is the most recently received billing data.

6. A method for generating independently verifiable billing data comprising:
    generating billing data based on actual network resource usage by a network user device, wherein said actual network resource usage of said network user device corresponds to at least one of an amount of time of connection of the network user device to an access gateway device, and a volume of data caused to be transferred by operation of said network user device;
    during said network resource usage, receiving said generated billing data and comparing said received billing data with corresponding billing data generated by an access gateway; and
    if said received billing data correlates to said corresponding billing data, storing predetermined portions of said received billing data.

7. The method defined by claim 6 further comprising decoding said received billing data prior to comparing said received billing data with said corresponding billing data.

8. The method defined by claim 7 where said decoding is one of asymmetric cryptography data decoding and digitally signed hash decoding from plaintext with digitally signed hash.

9. The method defined by claim 6 further comprising transmitting said predetermined portions of said received billing data to a billing service provider.

10. The method defined by claim 9 where said received billing data is the most recently received billing data.

11. A method for avoiding potentially fraudulent network resource usage, comprising:
    generating billing data based on actual network resource usage by a network user device, wherein said actual network resource usage of said network user device corresponds to at least one of an amount of time of connection of the network user device to an access gateway device, and a volume of data caused to be transferred by operation of said network user device, wherein said actual network resource usage of said network user device corresponds to at least one of an amount of time of connection network user device to the access gateway device, and a volume of data caused to be transferred by operation of said network user device;
    during said network resource usage, receiving said generated billing data and comparing said received billing data with corresponding billing data generated by an access gateway; and
    if said received billing data does not correlate to said corresponding billing data, terminating said network resource usage.

12. The method defined by claim 11 further comprising decoding predetermined portions of said received billing data prior to comparing said received billing data with said corresponding billing data.

13. The method defined by claim 12 wherein said decoding is one of asymmetric cryptography data decoding, and digitally signed hash decoding from plaintext with digitally signed hash.

14. The method defined by claim 11 further comprising transmitting notification of non-correlation of said received billing data with said corresponding billing data to a billing service provider.

15. The method defined by claim 14 wherein said notification includes predetermined portions of at least one of said received billing data and said corresponding billing data.

16. A system for avoiding potentially fraudulent network resource usage, comprising:
    means for generating billing data based on actual network resource usage by a network user device, wherein said actual network resource usage of said network user device corresponds to at least one of an amount of time of connection of the network user device to an access gateway device, and a volume of data caused to be transferred by operation of said network user device;
    means for receiving said generated billing data and comparing said received billing data with corresponding billing data generated by an access gateway during network resource usage; and
    means for terminating said network resource usage if said received billing data does not correlate to said corresponding billing data.

17. The system defined by claim 16 further comprising means for decoding predetermined portions of said received billing data prior to comparing said received billing data with said corresponding billing data.

18. The system defined by claim 17 wherein said means for decoding performs one of asymmetric cryptography data decoding, and digitally signed hash decoding from plaintext with digitally signed hash.

19. The system defined by claim 16 further comprising means for transmitting notification of non-correlation of said received billing data with said corresponding billing data to a billing service provider.

20. The system defined by claim 19 wherein said transmitted notification includes predetermined portions of at least one of said received billing data and said corresponding billing data.

* * * * *